United States Patent [19]

Spencer et al.

[11] Patent Number: 5,535,291
[45] Date of Patent: Jul. 9, 1996

[54] SUPERRESOLUTION IMAGE ENHANCEMENT FOR A SIMD ARRAY PROCESSOR

[75] Inventors: George L. Spencer, Longwood; Herbert A. Duvoisin, III; Jean Vasicek, both of Orlando, all of Fla.

[73] Assignee: Martin Marietta Corporation, Bethesda, Md.

[21] Appl. No.: 198,288

[22] Filed: Feb. 18, 1994

[51] Int. Cl.⁶ .................................................. G06K 9/40
[52] U.S. Cl. .......................... 382/254; 382/302; 382/278; 382/276; 364/807; 395/800
[58] Field of Search ................................. 382/54, 42, 45, 382/46, 49, 43, 41, 22; 364/807; 395/11, 24, 800

[56] References Cited

U.S. PATENT DOCUMENTS

| | | | |
|---|---|---|---|
| 4,384,273 | 5/1983 | Ackland et al. | 382/42 |
| 4,532,548 | 7/1985 | Zwirn | 382/54 |
| 4,683,496 | 7/1987 | Tom | 382/49 |
| 4,739,474 | 4/1988 | Holsztynski | 364/200 |
| 4,783,738 | 11/1988 | Li et al. | 382/49 |
| 5,173,947 | 12/1992 | Chande et al. | 382/154 |
| 5,179,714 | 1/1993 | Graybill | 395/800 |
| 5,253,308 | 10/1993 | Johnson | 382/49 |

OTHER PUBLICATIONS

Publication by M. I. Sezan & A. M. Tekalp titled "Survey of recent developments in digital image restoration," Optical Engineering vol. 29(5) pp. 393–404, published in May 1990.

Publication by M. A. Richards titled "Iterative Noncoherent Angular Superresolution", Proc IEEE pp. 100–105, published in Jun. 1988.

Publication by P. A. Jansson et al. titled "Resolution Enhancement of Spectra", Journal of the Optical Society of America, vol. 60(5), pp. 596–599, published in May 1970.

Publication by P. Jansson titled "Modern Constrained Nonlinear Methods" Deconvolution: with Applications in Spectroscopy, Chapt. 4 (academic Press), published in 1984.

Publication by B. R. Frieden titled "Restoring with Maximum Likelihood and Maximum Entropy", Journal of the Optical Society of America, vol. 62(4), pp. 511–518, published in Apr. 1972.

Publication by B. R. Frieden titled "Image restoration by discrete convolution of minimal length, " Journal of the Optical Society of America vol. 64(5) pp. 682–686, published in May 1974.

Publication by R. A. Gonsalves and H. M. Kao titled "Entropy–based algorithm for reducing artifacts in image restoration", Optical engineering, vol. 26(7), pp. 617–622, published in Jul. 1987.

Publication by S. F. Gull and G. J. Daniell titled "Image reconstruction from incomplete and noisy data", Nature, vol. 272, published in Apr. 20, 1978.

Publication by H. J. Trusell titled "The Relationship Between Image Restoration by the Maximum *A Posteriori* Method and a Maximum Entropy Method," IEEE Transactions on Acoustics, speech, and signal Processing, vol. ASSP–28(1) pp. 114–117, published in Feb. 1980.

(List continued on next page.)

*Primary Examiner*—Jose L. Couso
*Assistant Examiner*—Anh Hong Do
*Attorney, Agent, or Firm*—Burns, Doane, Swecker & Mathis

[57] ABSTRACT

A combination of image magnification and/or image zoom, superresolution processing techniques, and a parallel (SIMD) machine implementation achieve image enhancement and resolution that are better than diffraction-limited image enhancement and hence suitable for machine processing pattern recognition systems. One application is the separation of (normally) unresolved point source objects from background clutter and adjacent point objects that would, without superresolution processing, be indistinguishable. Furthermore, the real-time processing of the present invention allows the shapes of objects to be discerned at ranges two to four times greater than would normally be achievable.

30 Claims, 8 Drawing Sheets

OTHER PUBLICATIONS

Publication by S. F. Burch et al. titled "Image Restoration by a Powerful Maximum Entropy Method", *Computer Vision, Graphics, and Image Processing* vol. 23, pp. 113–128, published in 1983.

Publication by X. Zhuang et al. titled "The Principle of Maximum Entropy in Image Recovery", *Image Recovery: Theory and Application,* Chapter 5 (H. Stark ed.) (Academic Press) published in 1988.

Publication by E. Hecht and A. Zajac titled "*Optics,*" pp. 397–403 (Addison–Wesley), published in 1974.

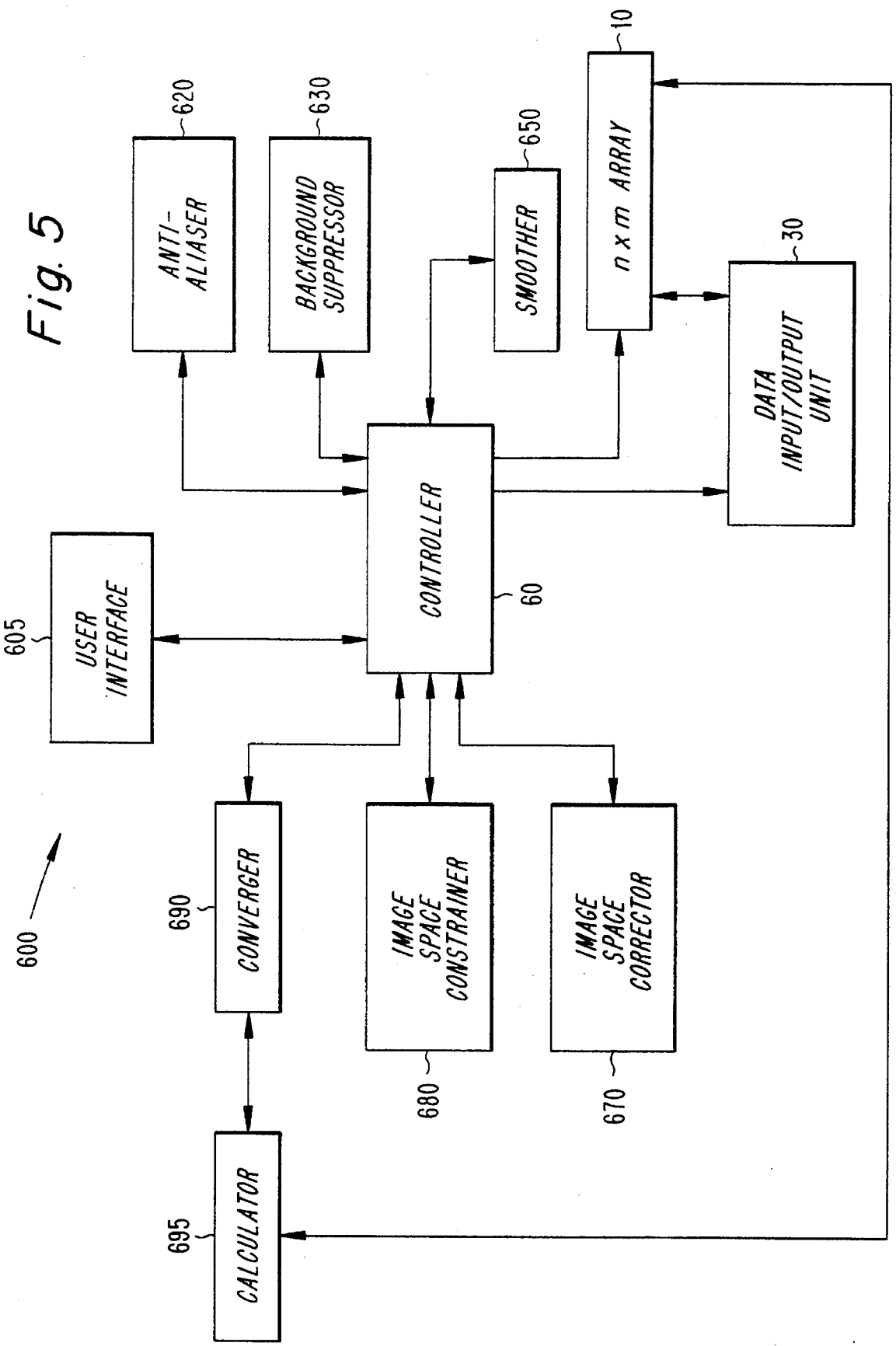

SUPERRESOLUTION IMAGE ENHANCEMENT FOR A SIMD ARRAY PROCESSOR

BACKGROUND

The present invention relates to a high speed parallel data processing system and, more particularly, to a parallel data processing system comprised of an array of identical interconnected cells operating under the control of a master controller to operate on single bits of data. Even more particularly, the present invention pertains to implementation of superresolution image enhancement in the Geometric Arithmetic Parallel Processor (GAPP), a Single Instruction-Multiple Datastream (SIMD) array processor, and provides real-time superresolution image enhancement processing.

The possibility of superresolution images, namely, images having better resolution than that obtained from purely linear geometrical considerations, was discovered in the early fifties. Since then superresolution algorithmic development and greatly increased computing power have made the technique practical. A recent example is the restoration of the Hubble space telescope imagery performed by NASA teams.

The superresolution image enhancement approach to real-time image processing is an example of certain data processing tasks that require that substantially identical logical or arithmetic operations be performed on large amounts of data. One approach to carrying out such tasks which is drawing increasing attention is parallel processing. In parallel processing, each element or cell of an array processor made up of such cells processes its own bit of data at the same time as all other cells of the array processor perform the same process on their own bit of data. Such machines are referred to by several names, including Single Instruction-Multiple Datastream (SIMD) array processors.

A common arrangement for such a machine is as a rectangular array of cells, with each interior cell connected to its four nearest neighboring cells and each edge cell connected to a data input/output device. Each cell is connected as well to a master controller which coordinates the movement of data through the array by providing appropriate instructions to the processing elements. Such an array proves useful, for example, in high resolution image processing. The image pixels comprise a data matrix which can be loaded into and processed quickly and efficiently by the processor array.

Although based upon the same genetic concept of an array of cells all performing the same function in unison, parallel processors vary in details of cell design. For example, U.S. Pat. No. 4,215,401 to Holsztynski et al. discloses a cell which includes a random access memory (RAM), a single bit accumulator, and a simple logical gate. The disclosed cell is extremely simple and, hence, inexpensive and easily fabricated. A negative consequence of this simplicity, however, is that some computational algorithms are quite cumbersome so that it may require many instructions to perform a simple and often repeated task.

U.S. Pat. No. 4,739,474, to Holsztynski et al., represents a higher level of complexity, in which the logic gate is replaced by a full adder capable of performing both arithmetic and logical functions. Pressing the full adder into dual service creates an efficiency which more than offsets the added complexity and cost incurred by including a full adder in each cell.

It is important to note that the substitution of a full adder for a logic gate, while superficially simple, is in reality a change of major consequence. The cell structure cannot be allowed to become too complex because in a typical array the cell will be repeated dozens if not hundreds of times. The cost of each additional element in terms of money and space on a VLSI chip is therefore multiplied many times. It is therefore no simple matter to identify those functions which are sufficiently useful to justify their incorporation into the cell. It is similarly no simple matter to implement those functions so that their incorporation is not realized at too high a cost.

Parallel processors may also vary in the manner of cell interconnection. As mentioned above, cells are typically connected to their nearest physical neighbors. All cells except those at the edge of the entire array are connected to four neighbors. It has not heretofore been completely appreciated, however, that significant benefits may flow from providing for alternate paths of interconnection and, specifically, in providing programmable, flexible interconnection between cells.

General mathematical properties of image enhancement and other digital image processing techniques are presented, for example, in *Digital Image Processing* (Addison-Wesley, 1992) by R. Gonzalez and R. Woods. General techniques useful in optics are presented, for example, in *Optics* (Addison-Wesley, 1974) by E. Hecht and A. Zajac. For the purposes of further background, the following additional references are noted: *Image Recovery: Theory and Application* (Academic Press, 1988) by Henry Stark; *Deconvolution with Applications in Spectroscopy* (Academic Press, 1984) by Peter Jansson (which is incorporated herein by reference); "Resolution Enhancement of Spectra," *J. Opt. Soc. Am.*, May 1970, vol. 60, by Peter A. Jansson et at.; "Survey of recent developments in digital image restoration," *Opt. Eng.*, May 1990, vol. 29, by Sezan and Tekalp; "Restoring with Maximum Likelihood and Maximum Entropy," *J. Opt. Soc. Am.*, vol. 62, pp. 511–18, by B. R. Frieden; "Image Restoration by Discrete Deconvolution of Minimal Length," *J. Opt. Soc. Am.*, vol. 64, pp. 682–86, by B. R. Frieden; "Image reconstruction from incomplete and noisy data," *Nature*, vol. 272, pp. 686–90, by S. F. Gull and G. J. Daniell; "The relationship between image restoration by the maximum a posteriori method and a maximum entropy method,' IEEE *Trans. Acoust. Speech Sig. Proc.*, ASSP-28(1), pp. 114–17 (1980), by H. J. Trussell; "Entropy-based algorithm for reducing artifacts in image restoration," *Opt. Eng.*, vol. 26(7), pp. 617–22 (1987), by R. A. Consalves and H.-M. Kuo; and "Image restoration by a powerful maximum entropy method," *Comp. Vision Graph. Image Proc.*, vol. 23, pp. 113–28 (1983), by S. F. Burch, S. F. Gull, and J. Skilling; "Iterafive Noncoherent Angular Superresolution," *Proc. IEEE*, pp. 100–05, June 1988, by Mark A. Richards (which is incorporated herein by reference).

The classical limit for visual optical systems to separate point objects is given approximately by $R = \lambda/d$, where R is the Rayleigh distance, $\lambda$ is the wavelength of light, and d is the optical aperture. For machine systems, the limit is two to four times greater because the objects need to be nearly completely separated so that amplitude and position may be accurately measured. Superresolution techniques can be used to recover lost resolution, but practical requirements have made prior real-time implementations impractical because of the following requirements:

1. High magnification (approximately five samples across the Airy disk) is required to achieve a non-aliased image. Usually this results in an impractical small optical field-of-view.

2. A sensitive focal plane array with a large number of pixels to compensate for the high required magnification.

3. Fast processing algorithms and hardware to achieve superresolution in real time.

4. Highly uniform focal plane arrays to avoid fixed pattern noise and dead pixels.

It is therefore desireable to provide techniques and devices that satisfy these requirements.

SUMMARY

Image magnification and/or oversampling to obtain an unaliased image, superresolution processing algorithms, and a parallel, single instruction-multiple datastream (SIMD) array processor implementation cooperate to achieve image enhancement and resolution that are better than diffraction-limited image enhancement, and hence are suitable for machine processing pattern recognition systems. One application is the separation of (normally) unresolved point source objects from background clutter and adjacent point objects that would, without superresolution processing, be indistinguishable. Furthermore, the real-time processing of the present invention allows the shapes of objects to be discerned at ranges two to four times greater than would normally be achievable.

The superresolution image enhancement implementation is suitable for a parallel data processor comprised of an array of identical cells concurrently performing identical operations under the direction of a central controller, and incorporating one or more special cell architectures such as a segmented memory, conditional logic for preliminary processing, and circuitry for indicating when the cell is active, and programmable cell interconnection including cell bypass and alternate connection of edge cells. The superresolution image enhancement implementation is also suitable for a single instruction-multiple datastream (SIMD) systolic array processor having provision for local address generation, direct access to external devices, and programmable cell interconnectivity for providing great versatility while at the same time retaining the advantages of the SIMD architecture.

Applications include use of superresolution image enhancement for superresolving optical images in both one and two dimensions. Experimental results to date demonstrate (both analytically and with test data) resolution well beyond classical limits.

BRIEF DESCRIPTION OF THE DRAWINGS

The foregoing and other features of the present invention will become apparent to one of ordinary skill in the art to which the invention pertains from the following detailed description when read in conjunction with the drawings, in which:

FIG. 5 illustrates schematically an exemplary embodiment of a device according to the present invention for implementing superresolution image enhancement real-time processing;

DETAILED DESCRIPTION OF PREFERRED EMBODIMENTS

Figure 1A:
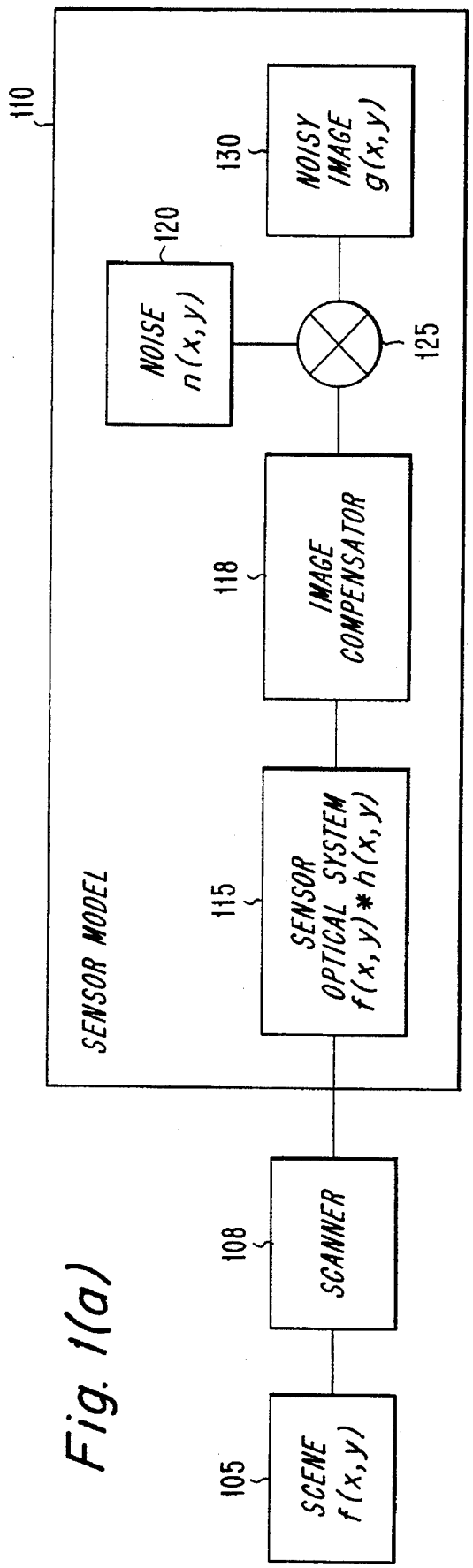
FIGS. 1(a) and (b) schematically represent a sensor model and superresolution processing according to a preferred embodiment of the present invention.

The superresolution image enhancement processing of the present invention can be implemented most advantageously in a single instruction-multiple datastream (SIMD) machine such as a version of the Geometric Arithmetic Parallel Processor ("GAPP III") described in commonly assigned U.S. Patent application No. 07/254,718, which is incorporated herein by reference, and the version of the GAPP ("GAPP IV") described in commonly assigned U.S. Patent application No. 08/112,540, which is also incorporated herein by reference. Throughout the remainder of this description, the term "GAPP" will be used to generally refer to either of the GAPP III or GAPP IV processors, which are the preferred processors for use in the present invention. The GAPP is a fine-grained, mesh-connected computer, wherein each processor element is a 1-bit serial arithmetic logic unit (ALU) with 128 bits (GAPP III) or 198 bits (GAPP IV) of random access memory (RAM). Before describing the superresolution image enhancement processing implementation of the present invention, several embodiments of SIMD array processors are described that are useful for implementing the present invention.

Exemplary SIMD Array Processors for Superresolution Image Enhancement

General details concerning the arrangement of parallel processors as an array of identical cells in the GAPP are available from aforementioned U.S. Pat. No. 4,739,474 to Holsztynski et al., hereinafter the "Holsztynski patent", the specification of which is incorporated here by reference. More specific details concerning arrangements of parallel processors as arrays of identical cells that are particularly useful for implementing the present invention are disclosed in the following co-pending patent application and issued patents (all assigned to the present assignee): U.S. Patent application No. 07/254,718; U.S. Pat. No. 5,179,714 to Graybill, hereinafter the "Graybill patent", directed to an Advanced Systolic Array Processor (ASAP); and U.S. Pat. No. 5,173,947 to Chandé et al., hereinafter the "Chandé patent", directed to a conformal image processor. The specifications of the Graybill and Chandé patents are incorporated here by reference. Features of these systems which make them especially useful include their north, south, east, and west connectivity (with wraparound capability), and the capability for internal arithmetic and logic operations. Additionally, ASAP systems are endowed with extensive internal memory for each cell, and, like the later GAPP systems, the capability within each cell for local address generation. The present invention will therefore be described as it would be implemented in these systems. It will be understood by one having ordinary skill in the art, however, that the invention could also be implemented in other systems.

Image Restoration

Image frequencies may be restored by deconvolution and superresolution techniques. De, convolution, or inverse filtering, is effected by filtering the image in either the image space or frequency domains. The restoration process is a trade-off between sharpening and smoothing the image, which can be controlled by the type of filter and filter constants used. For example, inverse filters and/or Wiener filters, defined in the above-cited Gonzalez and Woods text, can be used to effect deconvolution.

Superresolution techniques include, for example, iterative deconvolution, as described above and shown in FIGS. 1(a) and 1(b), and maximum entropy techniques. Iterative deconvolution performs the restoration process in small steps, applying constraints at each step, so that ringing and other artifacts are greatly reduced. For example, the techniques presented in the above-cited Richards and Jansson papers are iterative deconvolutions, while the technique presented in the above-cited Ffieden paper and the methods described in the papers by Gull, Daniell, Trussell, Gonsalves, Kuo, Burch, and Skilling are maximum entropy procedures. The result of either iterative deconvolution or a maximum entropy technique is a significant improvement in resolution, i.e., ability to detect/distinguish closely spaced objects. The term superresolution is used because the restored object can have frequency content higher than present in the original image output from the sensor model 110, the restored object receiving contributions from frequency components beyond the optical cut-off frequency.

Iterative Deconvolution (Superresolution)

The effects of a sensor system on an object can be described in terms of the spatial frequencies u and v as:

$$G(u,v) = H(u,v) \cdot F(u,v) + N(u,v)$$

where G(u,v) is the frequency representation of the image, H(u,v) is optical/sensor system transfer function, N(u,v) is the noise contributed by the sensor system, and F(u,v) is the spatial frequency content of the object.

It would seem that if one could find the inverse $H^{-1}(u,v)$ of H(u,v), then F(u,v) could be determined by the process of inverse filtering:

$$F(u,v) = H^{-1}G(u,v) - H^{-1}N(u,v)$$

assuming that one also knows N(u, v) the transform of the noise n(x,y). this process is easy and simple but typically the results are not good. The restored objects exhibit significant ringing and artifacts because $H^{-1}$ is singular. Wiener filtering compensates for the degradation of the system OFF, but in the process the noise is amplified as well.

Inverse filtering applies $H^{-1}(u,v)$ in one step but does not utilize all the information available in the process. Similarly, Wiener filtering applies $H(u,v)/(H^2(u,v)+N^2(u,v)/S^2(u,v))$ in one step but again does not utilize all the information available in the process, and requires some knowledge of S(u, v), the power spectrum of the object. Specifically, the information that the restored image (the object) must be positive and of finite extent and have finite support is information that is under-utilized in one-step inverse and Wiener filtering. Indeed, the information that the restored image (the object) must be positive and of finite extent and have finite support is information that is under-utilized in any other one-step filtering.

Optical Blurring

Figure 3:
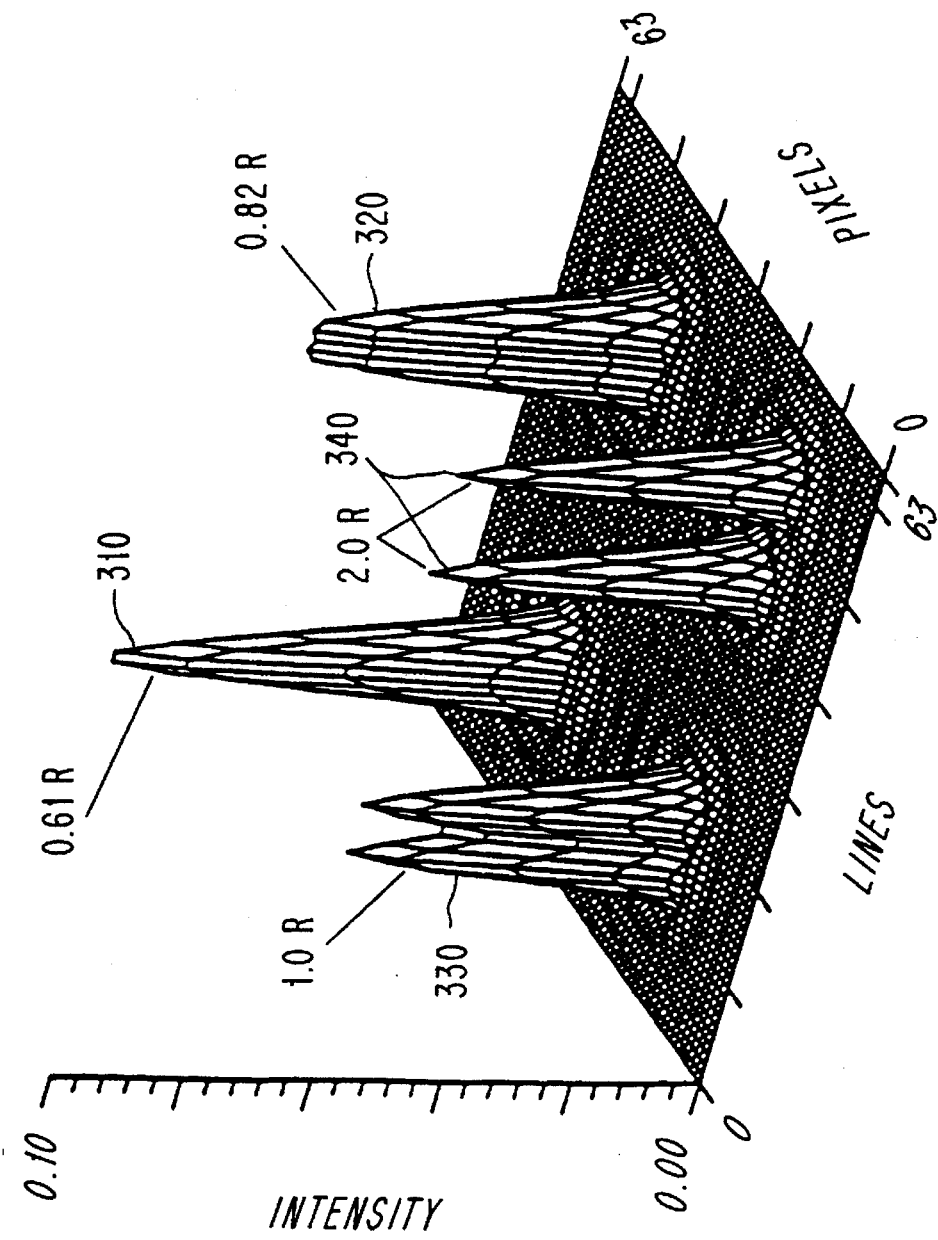
FIG. 3 shows examples of optical blurring.

FIG. 3 illustrates the appearance of optically blurred point objects 310, 320, 330, 340 of various separations. The optical image of a point object appears blurred over a diameter which is referred to as an optical blur or "Airy disk" (e.g., either of the two objects marked 2.0 R). As the objects are placed closer they blend together until they can just be distinguished as separate objects. This is usually said to occur when the objects are separated by the Rayleigh distance 1.0 R, which is one-half of the diameter of the Airy disk (i.e., the "blur diameter"), as shown in reference to point object 330 in FIG. 3. For separations that are less than 1.0 R, for example, for the objects 320 shown in FIG. 3, which are separated by 0.82 R, the objects become less and less distinguishable as separate objects. The superresolution techniques of a preferred embodiment of the present invention, however, have the capability of completely separating objects which are spaced 0.61 Rayleigh (0.61 R) apart (point objects 310), which appear, as shown in FIG. 3, to be one object.

Image Sampling and Magnification

The results of applying the superresolution techniques of a preferred embodiment of the present invention show that the ability of an optical system to separate closely spaced objects can be improved by nearly a factor of four over a conventionally designed system. An important part of the restoration process is the proper sampling of the optical image. Typical sensors are designed such that the optical blur, the Airy disk, just fills one detector. This is a compromise between detection capability and resolution, but the resulting image resolution is compromised because of significant detector smearing, due to the detector width, and an aliased image is produced (which negates any image restoration).

Proper sampling requires approximately five samples across the Airy disk. This may be accomplished by oversampling or by using appropriate magnification. Better resolution can be achieved using high magnification because the system OTF is increased due to the better detector OTF; the better resolution is, however, obtained at the expense of a smaller field-of-view.

Preferred Embodiments of the Invention

The principles of the invention will now be described in connection with the SIMD arrays, which are particularly advantageous for implementing the superresolution image enhancement processing of the present invention which is described in detail below.

FIG. 1 (a) schematically illustrates a sensor model 110 useful for modelling the effects of a sensor optical system 115 and noise 120 producing the noisy image g(x,y) 130 from the scene f(x,y) 105. Signals from the scene f(x,y) 105 are to be processed by the sensor optical system 115, and this processing can be modelled as the convolution f(x,y) * h(x,y) in the image space domain of the input image scene f(x,y) with the optical system's point spread function (PSF) h(x,y). The PSF represents the effects of the sensor optical system on an impulse input Dirac delta function δ(x,y). Signals output from the sensor optical system 115 are eventually added to noise n(x,y) (from stage 120) in combiner 125, giving the noisy image g(x,y) 130. Sensors having poor image quality due to fixed pattern noise or dead pixels can be compensated by moving the image over the array in a small area (2 to 4 pixel size) in small steps using image scanner 108 and then re-registering the image using image motion compensator 118. This motion compensation is accomplished entirely in the GAPP processor. This technique is well known by those familiar with control theory and SIMD processing techniques, and is not explained here in further detail.

The point spread function h(x,y) for the sensor optical system 115 is the response g(x,y) of the sensor optical system 115 to a unit impulse Dirac delta function δ(x,y), i.e., a point of light, given by the convolution in the image space domain:

$$g(x,y) = \delta(x,y)*h(x,y) = \int_{-\infty}^{\infty}\int_{-\infty}^{\infty} \delta(s,t)h(x-s,y-t)dsdt = h(x,y) \quad 5$$

where $h(x,y)$ is also sometimes known as the impulse response function (IRF). The Fourier transform $H(u,v)= F\{h(x,y)\}$ of the PSF $h(x,y)$ for the sensor optical system 115 is known as the optical transfer function (OTF). Given the PSF $h(x,y)$ for the sensor optical system 115, the sensor system's response to an arbitrary input image scene $f(x,y)$ is the convolution $f(x,y) * h(x,y)$ in the image space domain. Alternatively, and equivalently, given the OTF $H(u,v)$ for the sensor optical system 115, the sensor system's response to an arbitrary input image scene $f(x,y)$ is the product $F(u,v)H(u,v)$ in the frequency domain. The output image $g(x,y)$ according to the sensor model 110 is given by:

$$g(x,y)=f(x,y)*h(x,y)+n(x,y)$$

where $n(x,y)$ is the noise 120 added to the output $f(x,y) * h(x,y)$ of the sensor optical system 115 by the combiner 125.

Alternatively, the sensor output in the frequency domain is given by:

$$G(u,v) = H(u,v) \cdot F(u,v) + N(u,v)$$

Figure 1B:
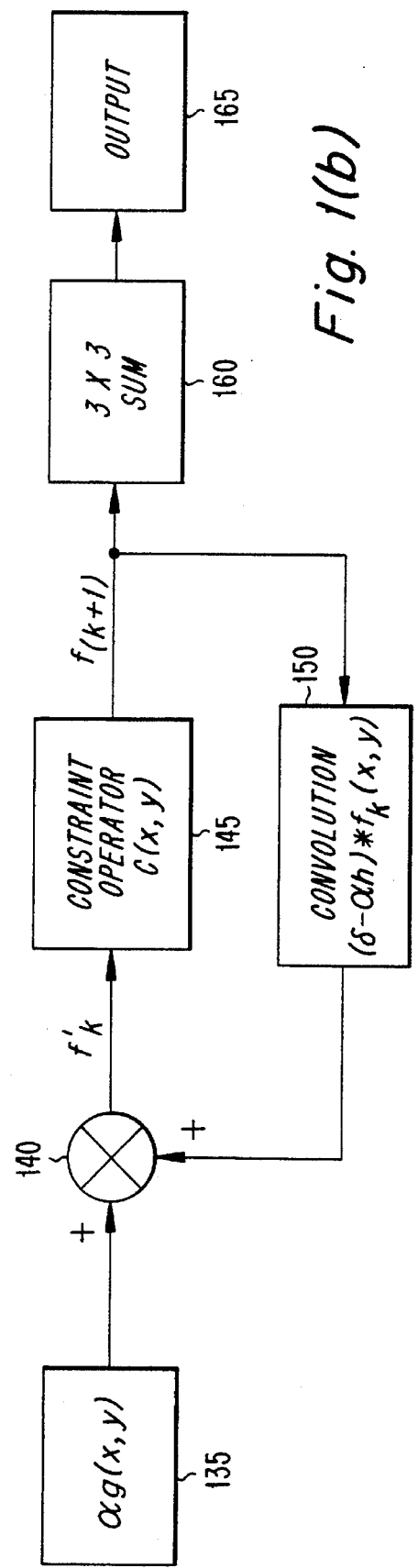

For noisy images the restoration technique illustrated in FIG. 1(b), using convolutions, is the preferred method. For this case, better restoration results are obtained using a small convolution operator which is approximately the same size as the Airy disk; an additional benefit is that this is the fastest mode of the SIMD processor.

The iterative equations, illustrated in FIG. 1(b), for object restoration in image space are:

$$F^1_{(k+1)}=F_k+\alpha\{g - h*f_k\} \quad (1)$$

$$f_{(k+1)}= C\{f^1_{(k+a)}\} \quad (2)$$

where $g = g(x,y)$ is the sensor image, $f_k = f_k(x,y)$ is the $k^{th}$ step in the restoration process of the object, $\alpha(<\approx 2)$ is the gain factor, and C is the constraint operator. The last term in equation (1) is proportional to the mismatch between the image and the restored object, i.e., it is the correction term added to $f_k(x,y)$ to obtain the next nonconstrained estimate, to the object $f(x,y)$. In equation (1), $f^1_{(k+1)}$ is a next nonconstrained object estimate. In equation (2), $f_{(k+1)}$ is the $(k+1)^{th}$ object estimate including the constraints (e.g., positivity and/or finite support). The $(k+1)^{th}$ output of equation (2) then becomes the $k^{th}$ input to equation (1). The origin of these equations is widely known in the literature. See, for example, the papers by Jansson and Richards, cited and incorporated herein by reference earlier. The maximum entropy method (see, for example, the Gull and Skilling articles cited earlier) also minimizes the mismatch between the image and blurred object but in addition it searches for the most probable object for a given mismatch. In general, the results using maximum entropy methods are superior. However, maximum entropy methods are also more computationally intense, requiring approximately five times more calculations than the methods of Richards or Jansson.

A preferred implementation is obtained by rearranging equations (1) and (2) as follows:

$$f^1_{(k+1)}= \alpha g + (\delta-\alpha h)*f_k \quad (3)$$

$$f_{(k+1)}= C\{f^1_{(k+1)}\} \quad (4)$$

where $\delta = \delta(x,y)$ is the Dirac delta function. A preferred implementation of equations (3) and (4) is illustrated schematically in FIG. 1(b) as follows:

(1) Use image magnification and appropriate sampling to prevent aliasing (stage 135).

(2) When required, use a scanner 108 and image compensator 118 (illustrated in FIG. 1(a)) to construct each frame of data, $g(x,y)$, from many sub-frames by moving the shifting over the array and using the SIMD processor to re-register the image so as to remove the effect of dead pixels and nonuniformities of the array.

(3) Suppress the image background outside the area of interest and multiply by $\alpha$ (stage 135).

(4) If required for convergence, apply appropriate smoothing to image and point spread function. This is accomplished by replacing $\alpha g$ and h with $\alpha s*g$ and $s*h$, respectively, where $s = s(x,y)$ is the smoothing operator. A possible, but not the only choice, is to smooth $g(x,y)$ and $h(x,y)$ using an ideal optical PSF.

(5) Generate $f^1_{(k+1)}$ of equation (3) by summing the outputs of stages 135 and 150. The convolution operator should be as small as possible (typically the size of the AIRY disk) so that the SIMD processor has maximum speed.

(6) Apply the constraint operator 145 to form the output of equation (4). The output of the constraint operator (stage 145) is $f_{(k+1)}$; this then becomes $f_k$ for the next iteration. Several superresolution constraint techniques are possible, such as those described by the earlier cited Richards and Jansson articles.

(7) Iterate equations (1) and (2) until the desired convergence is obtained. A preferred method to determine the number of iterations is a statistical analysis of the restored data. For example, if point objects are to be separated and their amplitudes are desired, the optimum number of iterations would be determined by maximizing the ratio of mean amplitude to amplitude variance. The optimum number of iterations will be a function of input parameters such as signal to noise ratio, PSF, convolution operator size, etc. The advantage of this technique is that the parameters affecting the optimum number of iterations is known a priori, so that no additional computing time is required. This will be a function of the input parameters such as signal/noise ratio, PSF, convolution operator size, etc., and therefore requires no additional processing time. Typically iterations are required for an input signal to noise ratio value of 5-10/1. Other methods of determining the number of iterations have been described in the literature.

(8) For point objects, the final amplitude is obtained by summing an area centered in the neighborhood of the maximum pixel.

The above convolution restoration technique is the preferred method for the restoration of real time images of poor quality due to either random or fixed pattern noise. Point objects separated by an angular distance of one Rayleigh can be completely separated. For images of better quality, better restorations are possible; for this case, a larger convolution operator is desired requiring a tradeoff to determine whether the convolution or Fourier transform is the faster implementation.

Figure 2:
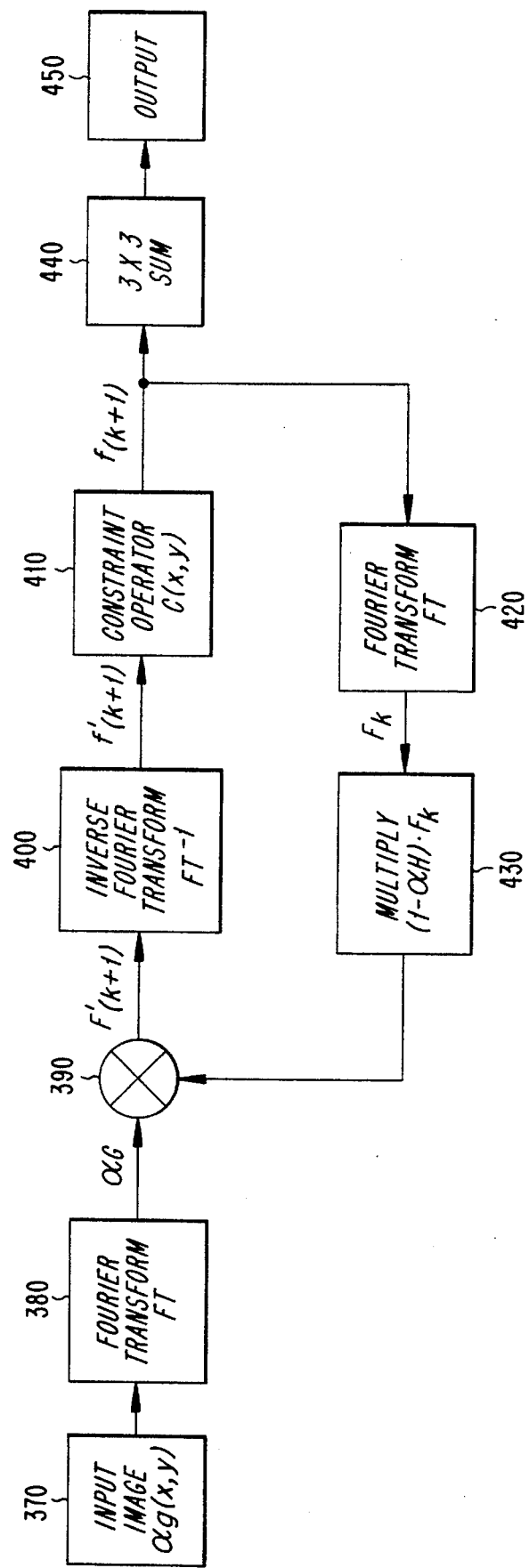
FIG. 2 displays a recursion relation employed in another preferred embodiment of the present invention.

Another preferred embodiment of this invention, using the SIMD processor to perform Fourier transforms, is schematically illustrated in FIG. 2. The equations that are implemented by the embodiment of FIG. 2 follow directly from the Fourier transform of equations (3) and (4):

$$F^1_{(k+1)} = \alpha G + (1-\alpha H)F_k \quad (5)$$

$$F_{(k+1)} = FT\{C[FT^{-1} F^1_{(k+1)}]\} \quad (6)$$

where FT is the Fourier transform operator, $F_k = F_k(u,v) = k^{th}$ iteration, and (u,v) are the spatial frequencies in the Fourier domain. The steps for implementing this recursion relation are as follows:

(1) Input the image $\alpha*g(x,y)$ into image input stage 370.

(2) Use a first Fourier transform stage 380 to form the output $\alpha*G = \alpha*G(u,v)$.

(3) Use combiner 390 to additively combine $\alpha*G = \alpha*G(u,v)$ with the output of stage 430 to form the uncorrected object estimate $F'_{(k+1)}$.

(4) At stage 400, perform the inverse Fourier transform of F' to obtain the next uncorrected object estimate in the spatial domain, $f'_{(k+1)}$.

(5) Apply the spatial constraint to $f'_{(k+1)}$ using constraint operator 410. This is the new object estimate in the spatial domain, $f_{(k+1)}$.

(6) Use a second Fourier transform stage 420 to perform the Fourier transform of $f_{(k+1)}$, thereby generating $F_k$.

(7) Multiply $F_k$ by $(1-\alpha H)$, using multiplier 430, to obtain the input for the next iteration, $F_k(1-\alpha H)$.

(8) Repeat steps 3 through 7 until convergence is achieved.

The entire iterative process, frequency domain correction followed by spatial object correction, is repeated until convergence is achieved. Convergence is determined based on the results of a statistical analysis, as noted earlier.

The constraint procedure serves to keep the iterative correction process on track by reducing or eliminating known object errors (such as negative values in the estimate of the object).

If the object is known to consist of points, they typically will not restore on one pixel. To obtain their true amplitude, typically a 2×2 or 3×3 area is summed (in stage 440) in the neighborhood of the point to determine the correct amplitude.

Comparison of Restoration Techniques

Figure 4A:
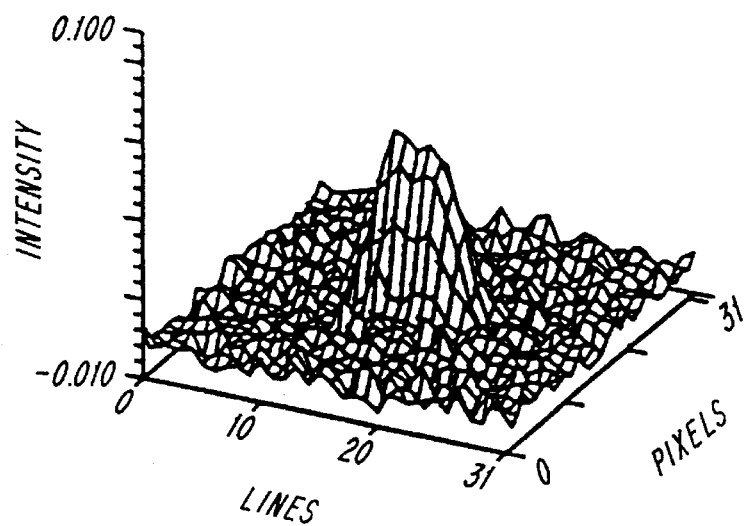
FIGS. 4(a)–(d) show comparisons of restoration techniques according to other preferred embodiments of the present invention.
Figure 4B:
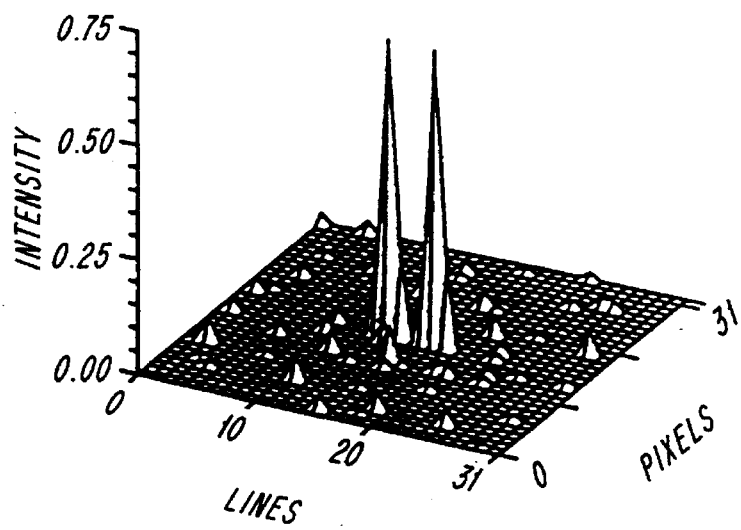
Figure 4C:
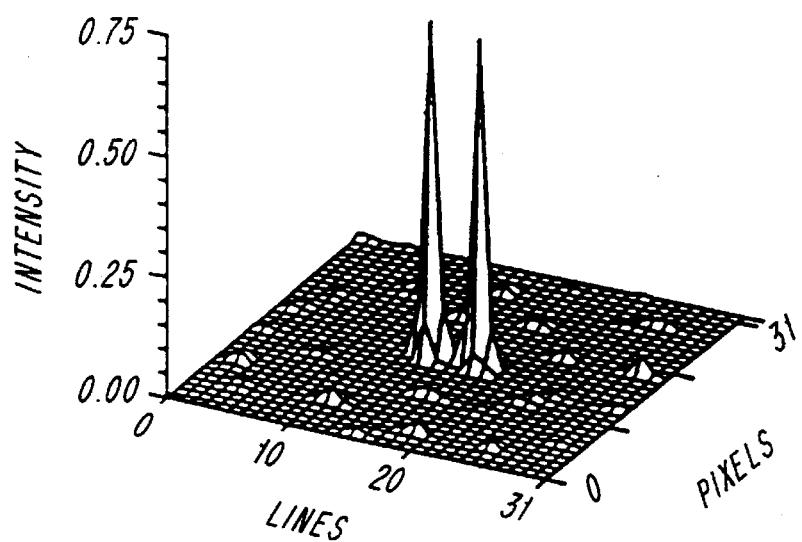
Figure 4D:
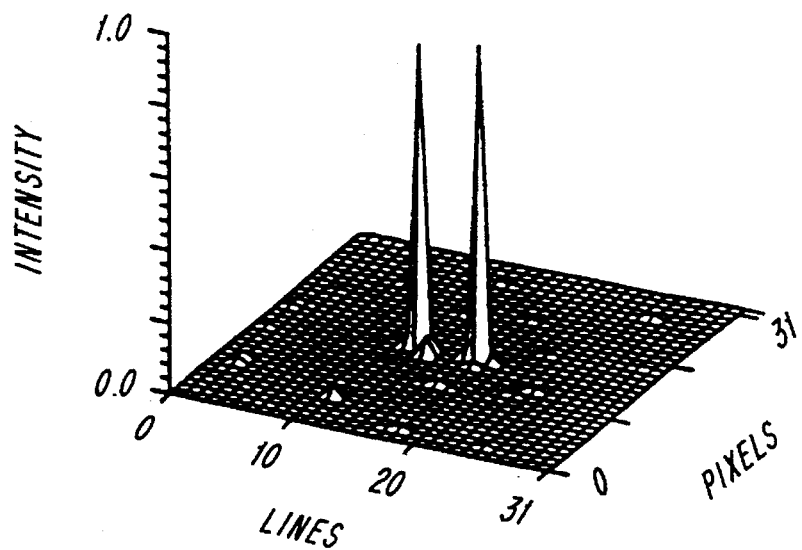

FIG. 4(a) shows two blurred noisy objects separated by 0.82 Rayleigh and having a signal/noise milo of 20/1. FIGS. 4(b), 4(c), and 4(d) compare the Richards, Jansson, and maximum entropy restoration methods of restoration of the objects shown in FIG. 4(a). FIG. 4(b) shows the object restored using the Richards technique. FIG. 4(c) shows the object restored using Jansson's technique. FIG. 4(d) shows the object restored using a maximum entropy technique. Maximum entropy has been found to be the better restoration technique. However, as stated above, maximum entropy techniques require approximately five times as many calculations. We have achieved excellent results separating objects when the signal-to-noise ratio (SNR) is as low as 5/1.

FIG. 5 illustrates schematically an exemplary embodiment of a device according to the present invention for implementing superresolution image enhancement real-time processing. The superresolution image enhancement real-time processor 600 shown in FIG. 5 is useful for separating unresolved point source objects from background noise and adjacent point objects for discerning shapes of objects at ranges from about two to about four times greater than would normally be attainable. The superresolution image enhancement real-time processor 600 includes a parallel processor having controller 60, a data input/output unit 30, and a plurality of substantially identical cells arranged as an n × m array 10. Processor 600 processes a first set of physical electrical signals, representing input digital data signals, into a second set of different, superresolution image enhanced physical electrical signals, representing output digital data signals, that are useful for real-time image signal processing and realtime image analysis.

Processor 600 has a user interface 605 allowing an operator (not shown) to communicate with controller 60 to control real-time image signal processing, and input data to and receive data from data input/output unit 30. Processor 600 has a plurality of devices connected to controller 60 as shown in FIG. 5 including an anti-aliaser 620 for sampling the magnified image to prevent image aliasing, a background suppressor 630 for suppressing the background outside of the sampled image area of interest, and a smoother 650 for smoothing the boosted, sampled image. As shown in FIG. 5, controller 60 is also connected to an image space corrector 670 for iteratively correcting successively processed image space images, an image space constrainer 680 for iteratively constraining successively processed corrected image space images, and a converger 690 for iteratively converging to a solution and expanding object frequency components, supplying frequencies higher than an optical diffraction limited cut-off frequency. Converger 690 is connected to a calculator 695 for performing the convergence calculations.

Figure 6:
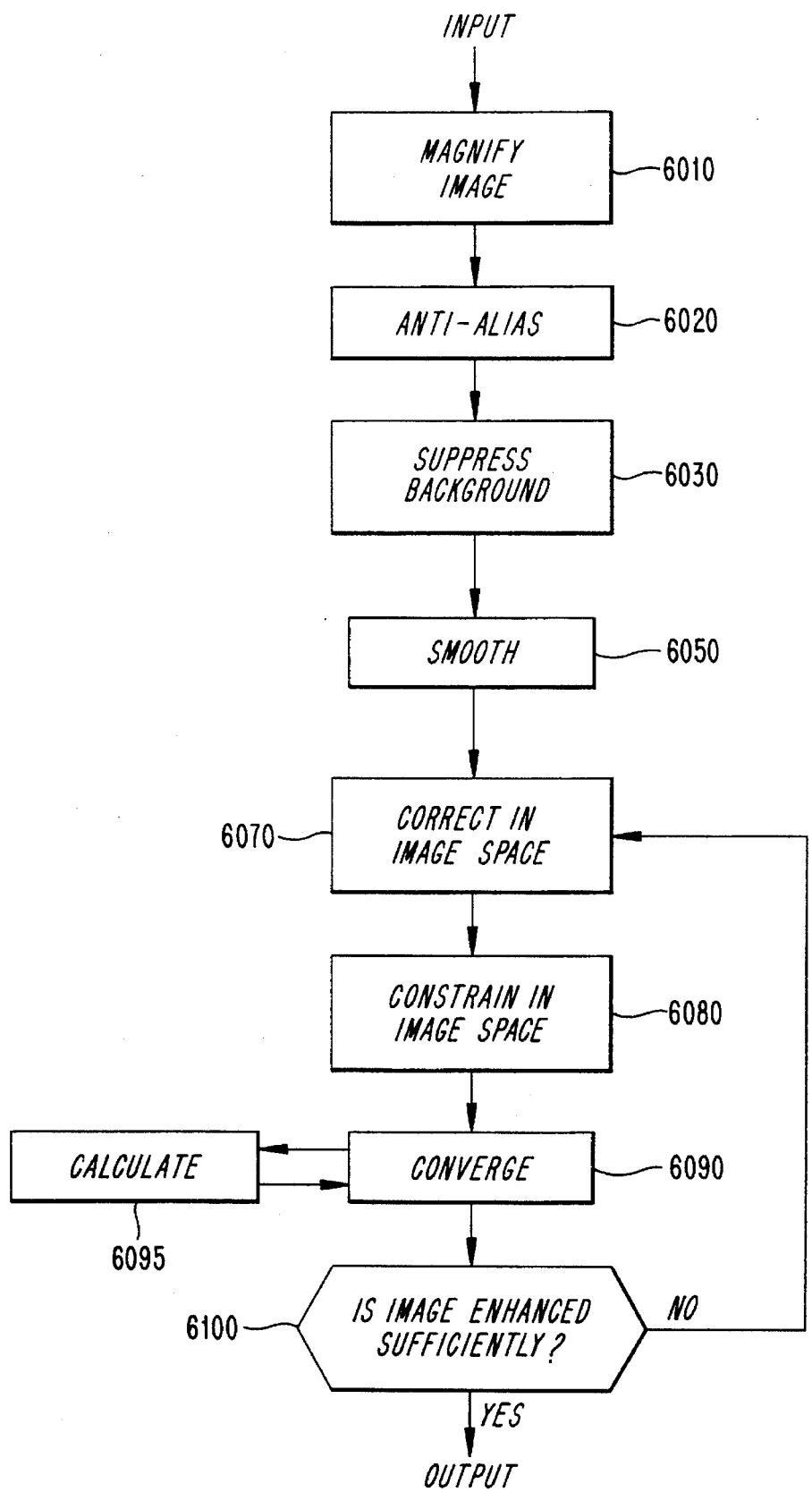
FIG. 6 illustrates schematically an exemplary embodiment of a method according to the present invention for superresolution image enhancement real-time processing.

FIG. 6 illustrates schematically an exemplary embodiment of a method according to the present invention for superresolution image enhancement real-time processing. The superresolution image enhancement real-time processing shown in FIG. 6 is useful for separating unresolved point source objects from background noise and adjacent point objects for discerning shapes of objects at ranges from about two to about four times greater than would normally be attainable. The superresolution image enhancement real-time processing shown in FIG. 6 is implementable using processor 600 shown in FIG. 5. The superresolution image enhancement real-time processing shown in FIG. 6 processes a first set of physical electrical signals, representing input digital data signals, into a second set of different, superresolution image enhanced physical electrical signals, representing output digital data signals, that are useful for real-time image signal processing and real-time image analysis.

An image is magnified (6010) and then sampled to prevent image aliasing (6020), the background outside the sampled image area of interest is suppressed (6030), and the sampled image is smoothed (6050). Then, as shown in FIG. 6, successively processed image space images are iteratively corrected (6070), successively processed corrected image space images are iteratively constrained (6080), and the procedure iteratively converges to a solution and expands object frequency components, supplying frequencies higher than an optical diffraction limited cut-off frequency (6090). Convergence calculations are performed at step 6095. The image to be output is tested to see whether the image is sufficiently enhanced, and is output if the image is sufficiently enhanced, with the procedure returning to step 6070 if the image in not sufficiently enhanced (6100).

The method and apparatus of the present invention are especially useful in several areas. An area of particular usefulness is in real-time image processing. An exemplary application in this area will now be discussed.

There is a need to provide real-time image processing based on the time domain or frequency domain approach to image analysis, enabling better pattern recognition, image enhancement, image registration, object tracking, bandwidth compression, and superresolution. Referring again to FIG. 5, these capabilities may be realized if the data input/output device 30 is a form of image sensor such as an infrared sensor, a sonar sensor, or even a video input device such as a camera. The signals are provided to the data input/output device 30 which, in cooperation with the controller 60, performs preliminary dam forming and data shaping operations and loads the formed and shaped data from the data input/output device 30 into the GAPP array 10. Without further costly transferring of data into and out of the GAPP array 10, the superresolution image enhancement of the present invention transforms the input data as described herein, and outputs the transformed data signals to the dam input/output device 30 which, in cooperation with the controller 60, outputs the transformed image signal for further image processing.

Figure 7:
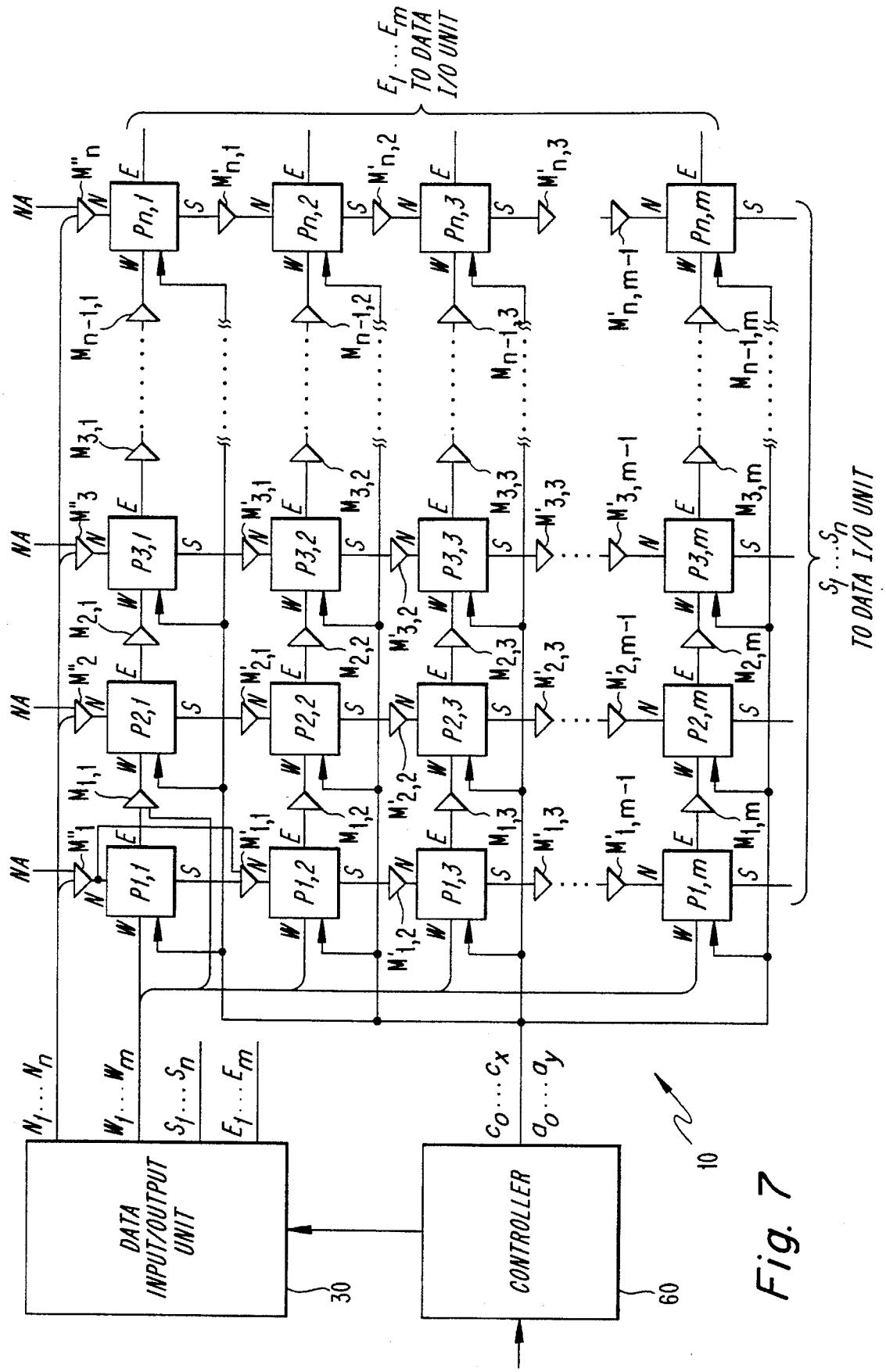
FIG. 7 is a block diagram of a preferred embodiment of a processor array useful for implementing the present invention.

For another exemplary application, consider a GAPP array 10, as in FIG. 7, with an L × L configuration, where L = $2^Q$ for some integer Q, used to implement the procedure illustrated in FIG. 2 using discretized Fourier transforms and inverse Fourier transforms.

The discretized Fourier transform of $f_D(x,y)$ is defined to be $F_K\{f_D(x,y)\}=F_D(u,v)$:

$$\Im_D\{f_D(x,y)\} = F_D(u,v) = \frac{1}{L} \sum_{x=1}^{L} \sum_{y=1}^{L} f_D(x,y)\exp(-2\pi i[xu+yv]/L)$$

with the discretized inverse Fourier transform of $F_D(u,v)$ defined to be $F^{-1}_D\{F_D(u,v)\}=f_D(x,y)$:

$$\Im_D^{-1}\{F_D(u,v)\} = f_D(x,y) = \frac{1}{L} \sum_{u=1}^{L} \sum_{v=1}^{L} F_D(u,v)\exp(2\pi i[xu+yv]/L)$$

The procedure illustrated in FIG. 2 using discretized Fourier transforms and inverse Fourier transforms includes the following steps:

1) distribute the estimates $f_k'(x,y)$ of the image scene to their respective (x,y) cell positions in an L × L GAPP array 10;

2) multiply the estimates $f_k'(x,y)$ in each cell by their respective Fourier exponential factors $\exp(-2\pi i[xu+yv]/L)$;

3) perform an array sum as follows:

(a) program the cell bypass network to full L × L configuration;

(b) command each cell to shift its variable to its eastern neighbor;

(c) command each cell to add the received variable to its resident value (which results in cells in columns 2, 4, 6, . . . , L containing a non-overlapping set of sums);

(d) program the cell bypass network to a L/2 × L configuration logically interconnecting columns 2, 4, 6, . . . , L;

(e) repeat steps (b) and (c) (which results in cells in columns 4, 8, . . . , L containing a non-overlapping set of sums);

(f) program the cell bypass network to a L/4 × L configuration logically interconnecting columns 4, 8, . . . , L;

(g) repeat step (e) until cells in column L contain the sums for the entire array from west to east; and (h) repeat the method north to south to sum cells in column L, halving the row configuration after each shift and add until the entire array sum resides in the cell at the southeastern corner of the array;

4) multiply the resulting array sum by 1/L, yielding the discretized Fourier transforms $F_k'(u,v)$ of the estimates $f_k'(x,y)$;

5) distribute the transforms $F_k'(u,v)$ to their respective (u,v) cell positions in an L × L GAPP array 10;

6) multiply the transforms $F_k'(u,v)$ in each cell by their respective OTF H(u,v) values;

7) add $\alpha*G(u,v)$ to $(1-\alpha*H(u,v))$ in each cell to form the recursive transforms $F'_{(k+1)}(u,v)$;

8) multiply the recursive transforms $F'_{(k+1)}(u,v)$ in each cell by their respective inverse Fourier exponential factors $\exp(2\pi i[xu+yv]/L)$;

9) multiply the resulting array sum by 1/L, yielding the discretized recursive estimates $f'_{(k+1)}(x,y)$;

10) redistribute these discretized recursive estimates $f'_{(K+1)}(x,y)$ to their respective (x,y) cell positions in an L × L GAPP array 10;

11) operate on the recursive estimates $f'_{(k+1)}$ of the image scene with a constraint operator such as positivity operator $P[F'_{(k+1)}(x,y)]$;

12) repeat steps 2) through 11), iteratively incrementing the k values; and 13) output the superresolution enhanced image scene signals for further processing.

An alternative exemplary embodiment replaces discretized Fourier transforms and inverse Fourier transforms with appropriate GAPP Fast Fourier Transform (FFT) techniques, as will be readily appreciated by one of ordinary skill in the art. The GAPP Fast Fourier Transform (FFT) techniques are described in A. Forman et at., *Parallel Algorithms For ATR Using Laser Radar Imagery*, 1348 S.P.I.E. 493 (1990). Additional references that discuss implementations of FFTs on SIMD parallel processors are: C. Burrus and T. Parks, *DFT/FFT and Convolution Algorithms*, (1985); K. Hwang and F. Briggs, *Computer Architecture and Parallel Processing*, (1984); I. Strong, *The Fourier Transform on Mesh Connected Processing Arrays Such as the Massively Parallel Processor*, I.E.E.E. Workshop on Computer Architecture for Pattern Analysis and Image Database Management 190–196 (Nov. 1985); A. Reeves and M. Gutierrez, *On Measuring the Performance of a Massively Parallel Processor*, I.E.E.E. Proceedings of the International Conference on Parallel Processing 261–270 (Aug. 1988); and D. Nassimi and S. Sahni *An Optimal Routing Algorithm for Mesh-connected Parallel Computers*, Journal of the Association for Computing Machinery 6–29 (Jan. 1980), which documents are hereby incorporated by reference.

These are only a few exemplary applications. It will be apparent to one having ordinary skill in the art that the invention will prove useful in additional applications as well.

The present invention has been described above in terms of specific embodiments. It will be readily appreciated by one of ordinary skill in the art, however, that the invention is not limited to these embodiments, and that, in fact, the principles of the invention may be embodied and practiced in devices and methods other than those specifically described above. For example, it has already been mentioned that other geometries for the arrays may be useful. Therefore, the invention should not be regarded as being limited to these specific embodiments, but instead should be regarded as being fully commensurate in scope with the following claims. Furthermore, any elements in the following claims expressed as a means or step for performing a specified function without the recital of structure, material, or acts in support thereof shall be construed to cover the corresponding structure, material, or acts described herein, and equivalents thereof.

What is claimed is:

1. A superresolution processor for generating a restored image from an input image, comprising:

means for inputting the input image as an initial image space domain image;

a processor that is responsive to control signals for processing dam in accordance therewith; and control means for generating control signals, including:

(a) means for generating first control signals that cause the processor to combine the initial image space domain image with a predetermined image space domain image to generate a first nonconstrained estimate of the restored image;

(b) means for generating second control signals that cause the processor to generate a constrained image space domain image from the first nonconstrained estimate of the restored image;

(c) means for generating third control signals that cause the processor to use the constrained image space domain image to generate a next predetermined image space domain image;

(d) means for generating fourth control signals that cause the processor to combine the next predetermined image space domain image with the initial image space domain image to generate a next nonconstrained estimate of the restored image for use as the first nonconstrained estimate of the restored image during a next iteration; and (e) means for repeating the generation of tile second, third and fourth control signals until the constrained image space domain image converges to the restored image, wherein the means for inputting the input image as an initial image space domain image comprises:

means for receiving the input image as a first registered image from a sensor that includes a sensor focal plane;

means for adjusting the sensor to cause the input image to shift to a new position on the sensor focal plane, and receiving from the sensor a shifted input image; and means in the processor for re-registering the shifted input image so that pixels in the shifted input image coincide with corresponding pixels in the first registered image, and then combining the re-registered input image with the first registered image to produce the initial image space domain image.

2. The superresolution processor of claim 1, wherein the repeating means repeats the generation of the second, third and fourth control signals for a predetermined number of times.

3. The superresolution processor of claim 1, wherein the means for generating the third control signals comprises: means for generating fifth control signals that cause the processor to convolve the constrained image space domain image by a term that includes an optical transfer function to generate the next predetermined image space domain image.

4. The superresolution processor of claim 3, wherein the means for generating fifth control signals cause the processor to perform the convolution with a convolution operator size that is substantially equal to an optical blur.

5. The superresolution processor of claim 1, wherein the means for generating fourth controls signals comprises means for generating fifth control signals that cause the processor to add the initial image space domain image to the next predetermined image space domain image.

6. The superresolution processor of claim 1, wherein the means for inputting the input image as an initial image space domain image comprises:

means for receiving the input image; and means, coupled to the receiving means, for generating the initial image space domain image by sampling the received input image at a sampling rate sufficient to prevent image aliasing during subsequent steps.

7. The superresolution processor of claim 1, wherein:

the processor is a parallel processor comprising a plurality of substantially identical processing cells, each of the processing cells being connected to at least one neighboring cell and responsive to the control signals for processing data in accordance therewith; and each of the plurality of substantially identical processing cells includes a full adder having two data input terminals, a carry input terminal, a sum output terminal, and a carry output terminal, and a plurality of memories connected to said full adder and said controller, the memories each being individually controllable to supply selected ones of a plurality of predetermined data signals to the input terminals of said full adder in response to control signals from the controller, the memories being connected to the full adder and the controller such that both logical and arithmetic operations are performed by the full adder.

8. The superresolution processor of claim 1, wherein the processor is a parallel processor comprising a plurality of substantially identical processing cells, each of the processing cells being connected to at least one neighboring cell and responsive to the control signals for processing data in accordance therewith.

9. A superresolution method for generating a restored image from an input image in a processor, comprising the steps of:

(a) receiving the input image as an initial image space domain image;

(b) in the processor, combining the initial image space domain image with a predetermined image space domain image to generate a first nonconstrained estimate of the restored image;

(c) in the processor, generating a constrained image space domain image from the first nonconstrained estimate of the restored image;

(d) in the processor, using the constrained image space domain image to generate a next predetermined image space domain image;

(e) in the processor, combining the next predetermined image space domain image with the initial image space domain image to generate a next nonconstrained estimate of the restored image for use as the first nonconstrained estimate of the restored image during a next iteration; and (f) in the processor, repeating steps (c)–(f) until the constrained image space domain image converges to the restored image, wherein the step of receiving the input image as the initial image space domain image comprises the steps of:

receiving the input image as a first registered image from a sensor that includes a sensor focal plane;

adjusting the sensor to cause tile input image to shift to a new position on the sensor focal plane to produce a shifted input image; and in the processor, re-registering the shifted input image so that pixels in the shifted input image coincide with corresponding pixels in the first registered image, and then combining the re-registered input image with the first registered image to produce the initial image space domain image.

10. The superresolution method of claim 9, wherein the step of repeating steps (c)–(f) until the constrained image space domain image converges to the restored image comprises repeating steps (c)–(f) for a predetermined number of times.

11. The method of claim 9, wherein the step of using the constrained image space domain image to generate a next predetermined image space domain image comprises in the processor, convolving the constrained image space domain image by a term that includes an optical transfer function to generate the next predetermined image space domain image.

12. The method of claim 11, wherein the step of convolving is performed with a convolution operator size that is substantially equal to an optical blur.

13. The method of claim 9, wherein the step of combining the next predetermined image space domain image with the initial image space domain image comprises adding the initial image space domain image to the next predetermined image space domain image.

14. The method of claim 9, wherein the step of receiving the input image as an initial image space domain image comprises the steps of:

receiving the input image; and generating the initial image space domain image by sampling the received input image at a sampling rate sufficient to prevent image aliasing during subsequent steps.

15. A superresolution processor for generating a restored image from an input image, comprising:

means for inputting the input image as an initial image space domain image;

a processor that is responsive to control signals for processing data in accordance therewith; and control means for generating control signals, including:

(a) means for generating first control signals which cause the processor to transform the initial image space domain image into an initial frequency domain image;

(b) means for generating second control signals which cause the processor to combine the initial frequency domain image with a predetermined frequency domain image to generate a first nonconstrained frequency domain estimate of the restored image;

(c) means for generating third control signals which cause the processor to convert the first nonconstrained frequency domain estimate of the restored image into a first nonconstrained image space domain estimate of the restored image;

(d) means for generating fourth control signals which cause the processor to generate a constrained image space domain image from the first nonconstrained image space domain estimate of the restored image;

(e) means for generating fifth control signals which cause the processor to use the constrained image space domain image to generate a next predetermined frequency domain image;

(f) means for generating sixth control signals which cause the processor to combine the next predetermined frequency domain image with the initial frequency domain image to generate a next nonconstrained frequency domain estimate Of the restored image for use as the first nonconstrained frequency domain estimate of the restored image during a next iteration; and (g) means for repeating the generation of the third, fourth, fifth, and sixth control signals until the constrained image space domain image converges to the restored image, wherein the means for inputting the input image as an initial image space domain image comprises:

means for receiving the input image as a first registered image from a sensor that includes a sensor focal plane;

means for adjusting the sensor to cause the input image to shift to a new position on the sensor focal plane, and receiving from the sensor a shifted input image; and means in the processor for re-registering the shifted input image so that pixels in the shifted input image coincide with corresponding pixels in the first registered image and then combining the re-registered input image with the first registered image to produce initial first image space domain image.

16. The superresolution processor of claim 15, wherein the repeating means repeats the generation of the third, fourth, fifth, and sixth control signals for a predetermined number of times.

17. The superresolution processor of claim 15, wherein the means for generating fifth control signals comprises:

means for generating seventh control signals which cause the processor to transform the constrained image space domain image into a constrained frequency domain image;

means for generating eighth control signals which cause the processor to multiply the constrained frequency domain image by a term that includes an optical transfer function to generate tile next predetermined frequency domain image.

18. The superresolution processor of claim 15, wherein the means for generating sixth control signals comprises means for generating seventh control signals which cause the processor to add the initial frequency domain image to the next predetermined frequency domain image.

19. The superresolution processor of claim 15, wherein the means for inputting the input image as an initial image space domain image comprises:

means for generating the initial image space domain image by sampling the input image at a sampling rate sufficient to prevent image aliasing during subsequent steps.

20. The superresolution processor of claim 15, wherein:

the processor is a parallel processor comprising a plurality of substantially identical processing cells, each of the processing cells being connected to at least one neighboring cell and responsive to the control signals for processing data in accordance therewith; and each of the plurality of substantially identical processing cells includes a full adder having two data input terminals, a carry input terminal, a sum output terminal, and a carry output terminal, and a plurality of memories connected to said full adder and said controller, the memories each being individually controllable to supply selected ones of a plurality of predetermined data signals to the input terminals of said full adder in response to control signals from the controller, the memories being connected to the full adder and the controller such that both logical and arithmetic operations are performed by the full adder.

21. The superresolution processor of claim 15, wherein the processor is a parallel processor comprising a plurality of substantially identical processing cells, each of the processing cells being connected to at least one neighboring cell and responsive to the control signals for processing dam in accordance therewith.

22. A superresolution method for generating a restored image from an input image in a processor, comprising the steps of:

(a) receiving the input image as an initial image space domain image;

(b) transforming the initial image space domain image into an initial frequency domain image;

(c) in the processor, using the initial frequency domain image to generate a first nonconstrained frequency domain estimate of the restored image;

(d) in the processor, converting the first nonconstrained frequency domain estimate of the restored image into a first nonconstrained image space domain estimate of the restored image;

(e) in the processor, generating a constrained image space domain image from the first nonconstrained image space domain estimate of the restored image;

(f) in the processor, using the constrained image space domain image to generate a next predetermined frequency domain image;

(g) in the processor, combining the next predetermined frequency domain image with the initial frequency domain image to generate a next nonconstrained frequency domain estimate of the restored image for use as the first nonconstrained frequency domain estimate of the restored image during a next iteration; and (h) in the processor, repeating steps (d)–(h) until the constrained image space domain image converges to the restored image, wherein the step of receiving the input image as an initial image space domain image comprises the steps of:

receiving the input image as a first registered image from a sensor that includes a sensor focal plane;

adjusting the sensor to cause the input image to shift to a new position on the sensor focal plane to produce a shifted input image; and in the processor, re-registering the shifted input image so that pixels in the shifted input image coincide with corresponding pixels in the first registered image, and then combining the re-registered input image with the first registered image to produce the initial image space domain image.

23. The superresolution method of claim 22, wherein the step of repeating steps (d)–(h) comprises repeating steps (d)–(h) for a predetermined number of times.

24. The method of claim 22, wherein the step of using the constrained image space domain image to generate a next predetermined frequency domain image comprises the steps of:

in the processor, transforming the constrained image space domain image into a constrained frequency domain image;

in the processor, multiplying the constrained frequency domain image by a term that includes an optical transfer function to generate the next predetermined frequency domain image.

25. The method of claim 22, wherein the step of combining the next predetermined frequency domain image with the initial frequency domain image comprises adding the initial frequency domain image to the next predetermined frequency domain image.

26. The method of claim 22, wherein the step of receiving the input image as an initial image space domain image comprises the steps of:

generating the initial image space domain image by sampling the input image at a sampling rate sufficient to prevent image aliasing during subsequent steps.

27. A superresolution processor for determining intensity of an object, comprising:

means for inputting an input image of the object as an initial image space domain image;

a plurality of substantially identical processing cells, each of the processing cells being connected to at least one neighboring cell and responsive to control signals for processing data in accordance therewith; and control means for generating control signals, including:

(a) means for generating first control signals that cause the plurality of substantially identical processing cells to combine the initial image space domain image with a predetermined image space domain image to generate a first nonconstrained estimate of a restored image of the object;

(b) means for generating second control signals that cause the plurality of substantially identical processing cells to generate a constrained image space domain image from the first nonconstrained estimate of the restored image of the object;

(c) means for generating third control signals that cause the plurality of substantially identical processing cells to use the constrained image space domain image to generate a next predetermined image space domain image;

(d) means for generating fourth control signals that cause the plurality of substantially identical processing cells to combine the next predetermined image space domain image with the initial image space domain image to generate a next nonconstrained estimate of the restored image of the object for use as the first nonconstrained estimate of the restored image during a next iteration;

(e) means for repeating the generation of the second, third and fourth control signals until the constrained image space domain image converges to the restored image of the object; and (f) means for summing intensities of pixels lying in a neighborhood of a point corresponding to the object in the restored image.

28. A superresolution method for determining intensity of an object, comprising the steps of:

(a) receiving an input image of the object as an initial image space domain image;

(b) in a parallel processor, combining the initial image space domain image with a predetermined image space domain image to generate a first nonconstrained estimate of a restored image of the object;

(c) in the parallel processor, generating a constrained image space domain image from the first nonconstrained estimate of the restored image of the object;

(d) in the parallel processor, using the constrained image space domain image to generate a next predetermined image space domain image;

(e) in the parallel processor, combining the next predetermined image space domain image with the initial image space domain image to generate a next nonconstrained estimate of the restored image of the object for use as the first nonconstrained estimate of the restored image of the object during a next iteration;

(f) in the parallel processor, repeating steps (c)–(f) until the constrained image space domain image converges to the restored image of the object; and (g) summing intensities of pixels lying in a neighborhood of a point corresponding to the object in the restored image.

29. A superresolution processor for determining intensity of an object, comprising:

means for inputting an input image of the object as an initial image space domain image;

a plurality of substantially identical processing cells, each of the processing cells being connected to at least one neighboring cell and responsive to control signals for processing data in accordance therewith; and control means for generating control signals, including:

(a) means for generating first control signals which cause the plurality of substantially identical processing cells to transform the initial image space domain image into an initial frequency domain image;

(b) means for generating second control signals which cause the plurality of substantially identical processing cells to combine the initial frequency domain image with a predetermined frequency domain image to generate a first nonconstrained frequency domain estimate of a restored image of the object;

(c) means for generating third control signals which cause the plurality of substantially identical processing cells to convert the first nonconstrained frequency domain estimate of the restored image of the object into a first nonconstrained image space domain estimate of the restored image of the object;

(d) means for generating fourth control signals which cause the plurality of substantially identical processing cells to generate a constrained image space domain image from the first nonconstrained image space domain estimate of the restored image of the object;

(e) means for generating fifth control signals which cause the plurality of substantially identical processing cells to use the constrained image space domain image to generate a next predetermined frequency domain image;

means for generating sixth control signals which cause the plurality of substantially identical processing cells to combine the next predetermined frequency domain image with the initial frequency domain image to generate a next nonconstrained frequency domain estimate of the restored image of the object for use as the first nonconstrained frequency domain estimate of the restored image of the object during a next iteration;

(g) means for repeating the generation of the third, fourth, fifth, and sixth control signals until the constrained image space domain image converges to the restored image of the object; and (h) means for summing intensities of pixels lying in a neighborhood of a point corresponding to the object in the restored image.

30. A superresolution method for determining intensity of an object, comprising the steps of:

(a) receiving an input image of the object as an initial image space domain image;

(b) transforming the initial image space domain image into an initial frequency domain image;

(c) in the parallel processor, using the initial frequency domain image to generate a first nonconstrained frequency domain estimate of a restored image of the object;

(d) in the parallel processor, converting the first nonconstrained frequency domain estimate of the restored image of the object into a first nonconstrained image space domain estimate of the restored image of the object;

(e) in the parallel processor, generating a constrained image space domain image from the first nonconstrained image space domain estimate of the restored image of the object;

(f) in the parallel processor, using the constrained image space domain image to generate a next predetermined frequency domain image;

(g) in the parallel processor, combining the next predetermined frequency domain image with the initial frequency domain image to generate a next nonconstrained frequency domain estimate of the restored image of the object for use as the first nonconstrained frequency domain estimate of the restored image of the object during a next iteration;

(h) in the parallel processor, repeating steps (d)–(h) until the constrained image space domain image converges to the restored image of the object; and (i) summing intensities of pixels lying in a neighborhood of a point corresponding to the object in the restored image.

* * * * *

UNITED STATES PATENT AND TRADEMARK OFFICE
CERTIFICATE OF CORRECTION

PATENT NO. : 5,535,291
DATED : July 9, 1996
INVENTOR(S) : George L. Spencer et al.

It is certified that error appears in the above-indentified patent and that said Letters Patent is hereby corrected as shown below:

```
On the title page:Item [56]
    Column 2, line 3, change "(academic" to --(Academic--;
and
             line 22, change "speech, and signal" to --
Speech, and Signal--.

Column 2, line 34, change "at." to --al.--;
             line 45, change "method,'" to --method,"--;
             line 48, change "Consalves" to --Gonsalves--;
and
             line 52, change "Iterafive" to --Iterative--.
    Column 3, line 62, change "blurting;" to --blurring;--.
    Column 4, line 67, change "De, convolution," to --
Deconvolution,--.
    Column 5, line 10, delete "de,";
             line 11, change "convolution," to
--deconvolution--;
             line 16, change "Ffieden" to --Frieden--; and
             line 43, change "OFF" to --OTF--.

Column 7, line 30, (equation (1)), change
```

$$"F^1_{(k+1)} = F_k + \alpha \{g - h * f_k\}"$$

to $$--f'_{(k+1)} = f_k + \alpha \{g - h * f_k\}--;$$

UNITED STATES PATENT AND TRADEMARK OFFICE
CERTIFICATE OF CORRECTION

PATENT NO. : 5,535,291
DATED : July 9, 1996
INVENTOR(S) : George L. Spencer et al.

It is certified that error appears in the above-indentified patent and that said Letters Patent is hereby corrected as shown below:

Column 7, line 31 (equation (2)), change

"$f_{(k+1)} = C\{f^1_{(k+\alpha)}\}$"

to

--$f_{(k+1)} = C\{f'_{(k+1)}\}$--;

line 32, change "$f_k=f,(x,y)$" to --$f_k=f_k(x,y)$--;
line 37, after "estimate," insert --$f'_{(k+1)}(x,y)$--; and
line 52, change ""requiting" to --requiring--.
Column 8, line 1 (equation (3)), change "$f^1_{(k+1)} = \alpha g + (\delta - \alpha h)*f_k$"

to

--$f'_{(k+1)} = \alpha g + (\delta - \alpha h)*f_k$--;

UNITED STATES PATENT AND TRADEMARK OFFICE
CERTIFICATE OF CORRECTION

PATENT NO. : 5,535,291  
DATED : July 9, 1996  
INVENTOR(S) : George L. Spencer et al.

Page 3 of 5

It is certified that error appears in the above-indentified patent and that said Letters Patent is hereby corrected as shown below:

Column 8, line 2 (equation (4)), change

"$f_{(k+1)} = C\{f^1_{(k+1)}\}$"

to

--$f_{(k+1)} = C\{f'_{(k+1)}\}$--;

line 11, change "army" to --array--;  
line 40, change "railo " to --ratio--; and  
line 46, after "Typically" insert --10--.  
Column 9, line 3 (equation (5)), change "$F^1_{(k+1)} = \alpha G + (1-\alpha H) F_k$"

to

--$F'_{(k+1)} = \alpha G + (1-\alpha H) F_k$--;

UNITED STATES PATENT AND TRADEMARK OFFICE
CERTIFICATE OF CORRECTION

PATENT NO. : 5,535,291
DATED : July 9, 1996
INVENTOR(S) : George L. Spencer et al.

It is certified that error appears in the above-indentified patent and that said Letters Patent is hereby corrected as shown below:

Column 9, line 4, (equation (6)), change

"$F_{(k+1)} = FT\{C[FT^{-1} F^1_{(k+1)}]\}$"

to

--$F_{(k+1)} = FT\{C[FT^{-1} F'_{(k+1)}]\}$--;

line 45, change "milo" to --ratio--.
Column 11, line 8, change "dam" to --data--;
line 14, change "dam" to --data--;
line 24, change "$F_K\{f_D(x,y)\}=F_D(u,v)$" to --$\mathscr{F}_D\{f_D(x,y)\}=F_D(u,v)$--;
line 29, change "$F^{-1}_D\{F_D(u,v)\{=f_D(x,y)$" to --$\mathscr{F}^{-1}_D\{F_D(u,v)\}=f_D(x,y)$--;
line 31-33 (second equation in column), change "$\mathscr{F}^1_D\{F_D(u,v)\}=f_D(x,y)=\frac{1}{L}\sum_{u=1}^{L}\sum_{v=1}^{L}F_D(u,v)\exp(2\pi i[xu+yv]/L)$"

to

--$\mathscr{F}^{-1}_D\{F_D(u,v)\}=f_D(x,y)=\frac{1}{L}\sum_{u=1}^{L}\sum_{v=1}^{L}F_D(u,v)\exp(2\pi i[xu+yv]/L)$--;

and

UNITED STATES PATENT AND TRADEMARK OFFICE
CERTIFICATE OF CORRECTION

PATENT NO. : 5,535,291  
DATED : July 9, 1996  
INVENTOR(S) : George L. Spencer et al.

It is certified that error appears in the above-indentified patent and that said Letters Patent is hereby corrected as shown below:

Column 11, line 41, change "$\exp(-2\pi i[xu + yv]/L)$" to --$\exp(-2\pi i[xu+yv]/L)$--.
Column 12, line 7, change "$\exp(2\pi i[xu + yv]/L)$" to --$\exp(2\pi i[xu + yv]/L)$--;
line 10, delete "$f'_{(K+}$";
line 11, change "$_{1)}(x,y)$" to --$f'_{(k+1)}(x,y)$--;
line 15, change "$P[F'_{(k+1)}(x,y)]$" to --$P[f'_{(k+1)}(x,y)]$--; and
line 25, change "at." to --al.--.
Column 13, line 2, change "dam" to --data--;
line 24, change "tile" to --the--; and
line 55, change "controls" to --control--.
Column 14, line 53, change "tile" to --the--.
Column 15, line 55, change "Of" to --of--.
Column 16, line 6, after "image" insert --,--;
line 23, change "tile" to --the--; and
line 59, change "dam" to --data--.

Signed and Sealed this

Seventeenth Day of June, 1997

Attest:

BRUCE LEHMAN

Attesting Officer

Commissioner of Patents and Trademarks